United States Patent
Ganihar

(10) Patent No.: US 11,354,855 B2
(45) Date of Patent: Jun. 7, 2022

(54) THREE-DIMENSIONAL BUILDING INFORMATION MODEL GENERATION SYSTEMS AND METHODS

(71) Applicant: SNAPTRUDE TECHNOLOGIES PRIVATE LIMITED, Bengaluru (IN)

(72) Inventor: Syed Altaf Hussain Ganihar, Bengaluru (IN)

(73) Assignee: SNAPTRUDE TECHNOLOGIES PRIVATE LIMITED, Bengaluru (IN)

( * ) Notice: Subject to any disclaimer, the term of this patent is extended or adjusted under 35 U.S.C. 154(b) by 27 days.

(21) Appl. No.: 16/963,112

(22) PCT Filed: Dec. 17, 2018

(86) PCT No.: PCT/IB2018/060175
§ 371 (c)(1),
(2) Date: Jul. 17, 2020

(87) PCT Pub. No.: WO2019/142038
PCT Pub. Date: Jul. 25, 2019

(65) Prior Publication Data
US 2021/0049812 A1    Feb. 18, 2021

(30) Foreign Application Priority Data
Jan. 18, 2018    (IN) .............................. 201841002147

(51) Int. Cl.
*G06T 17/05*    (2011.01)
*G06T 17/20*    (2006.01)

(52) U.S. Cl.
CPC .............. *G06T 17/05* (2013.01); *G06T 17/20* (2013.01); *G06T 2200/08* (2013.01)

(58) Field of Classification Search
CPC ...... G06T 17/05; G06T 17/20; G06T 2200/08
See application file for complete search history.

(56) References Cited

U.S. PATENT DOCUMENTS

2015/0227784 A1\* 8/2015 Roy ................... G06K 9/00201
                                                              382/103
2019/0370994 A1\* 12/2019 Norris ...................... G06T 7/73

\* cited by examiner

*Primary Examiner* — Said Broome
(74) *Attorney, Agent, or Firm* — Dave Law Group LLC; Raj S. Dave

(57) ABSTRACT

Embodiments of the present disclosure relate to systems and methods for generating 3D models of floor plans using two-dimensional (2D) image inputs. According to an embodiment, a three-dimensional building model generation system is disclosed that can include a two-dimensional image receive module to receive a 2D image pertaining to the floor plan, an image processing module to processes the two-dimensional image to generate a binary image, a two-dimensional floor plan graph generation module to extract two-dimensional geometry from the binary image to generate a two-dimensional floor plan graph, and a three-dimensional model generation module to generate a 3D model of the floor plan by performing geometric extrusion of the two-dimensional floor plan graph based on one or more cyclic wall graphs and one or more connectives.

9 Claims, 10 Drawing Sheets

THREE-DIMENSIONAL BUILDING INFORMATION MODEL GENERATION SYSTEMS AND METHODS

CROSS-REFERENCE TO RELATED APPLICATIONS

This application is the National Stage Entry of PCT/IB2018/060175 filed on Dec. 17, 2018, which claims priority to the Indian Application No. 201841002147, filed on Jan. 18, 2018, the entire disclosures of which are incorporated herein by reference as part of the disclosure of this application.

TECHNICAL FIELD

The present disclosure relates to the field of three-dimensional (3D) modeling and more particularly provides systems and methods for generating 3D models of floor plans using two-dimensional (2D) image inputs.

BACKGROUND

Background description includes information that may be useful in understanding the present disclosure. It is not an admission that any of the information provided herein is prior art or relevant to the presently claimed invention, or that any publication specifically or implicitly referenced is prior art.

Three-dimensional (3D) modeling is being used in the field of architecture for representing diagrams, building plans and other structures. Recently, 3D modeling is being used for most product designs owing to increasing product complexities. Currently Computer Aided Design (CAD) technology is used for 3D modeling of products and structures in most drafting and architectural industries. Several CAD solutions and/or products are available in the market such as Trimble SketchUp™, Autocad™, Autodesk Revit™ and 3DS Max™.

Most of the existing solutions use interactive designing systems to develop 3D models from two-dimensional (2D) inputs. For example, a known technique generates 3D models from a set of 2D floor plans using an algorithm to classify pixels from each floor plan as outside or inside. Inside pixels are drawn as horizontal rectangles and walls are drawn as vertical rectangles. Further, when a floor considered and the pixel below is interior and the pixel above is exterior, the floor is marked as a roof.

Another known technique combines aerial images and oblique images to form a 3D site model. The images are processed to identify building boundaries and outlines as well as to produce a depth map. The building boundaries and the depth map is combined to form a 3D plan view model or used separately as a 2D plan view model. The images and plan view model is further processed to determine roof models for the buildings in the scene.

However, existing solutions require multiple 2D inputs representative of the structure to be modeled. These solutions may not be able to account for dynamic changes in the floor plans (such as changes in positions of doors, windows, and so on) of the structures. In addition, generation of 3D models using the existing solutions can be time consuming and cumbersome. Moreover, most of the existing solutions require highly experienced professionals for operating the software, which in general are not easy to operate.

Therefore, there is need in the art to develop techniques pertaining to 3D modeling that can use a single 2D input as well as account for dynamic changes in floor plans. Further, there is a need in the art to develop techniques pertaining to 3D modeling that are time effective, less cumbersome and simultaneously provide enhanced performance and reliability.

OBJECTS OF THE PRESENT DISCLOSURE

Some of the objects of the present disclosure, which at least one embodiment herein satisfies are as listed herein below.

It is a general object of the present disclosure to provide system and method for generating a three-dimensional building information model from a two-dimensional image of a floor plan.

It is an object of the present disclosure to provide system and method for generating a three-dimensional building information model from a two-dimensional image of a floor plan that can account for dynamic changes in the floor plan.

It is another object of the present disclosure to provide system and method for generating a three-dimensional building information model from a two-dimensional image of a floor plan based on techniques that are time effective and less cumbersome.

It is another object of the present disclosure to provide system and method for generating a three-dimensional building information model from a two-dimensional image of a floor plan that provides enhanced performance and reliability as compared to existing solutions.

These and other objects of the present invention will become readily apparent from the following detailed description taken in conjunction with the accompanying drawings.

SUMMARY

The present application provides systems and methods for generating three-dimensional building information models using two-dimensional image of the floor plans.

An aspect of the present disclosure pertains to a three-dimensional building model generation system, comprising: a non-transitory storage device having embodied therein one or more routines operable to generate a three-dimensional model pertaining to a floor plan; and one or more processors coupled to the non-transitory storage device and operable to execute the one or more routines, wherein the one or more routines include: a two-dimensional image receive module, which when executed by the one or more processors, receives a two-dimensional image pertaining to the floor plan; an image processing module, which when executed by the one or more processors, processes the two-dimensional image to generate a binary image, wherein the binary image is generated based on conversion of the two-dimensional image in a gray-scale image and performing thresholding of the gray-scale image using a pre-determined threshold value; a two-dimensional floor plan graph generation module, which when executed by the one or more processors, extracts two-dimensional geometry from the binary image to generate a two-dimensional floor plan graph, wherein the two-dimensional floor plan graph represents one or more cyclic wall graphs and one or more connectives; and a three-dimensional model generation module, which when executed by the one or more processors, generates a three-dimensional model of the floor plan by performing geometric extrusion of the two-dimensional floor plan graph based on the one or more cyclic wall graphs and the one or more connectives, wherein the geometric extrusion is performed by interpolation of the two dimensional floor plan graph along an axis perpendicular to a plane of the two-dimensional floor plan graph to generate a point cloud and performing a polygonal meshing operation on said generated point cloud.

In an embodiment, the two-dimensional image pertaining to the floor plan is any of a hand-drawn image of the floor plan, a sketch of the floor plan, a photograph of the floor plan or a computer generated image of the floor plan.

In an embodiment, the image processing module morphs the binary image to remove distortion caused by noise content from the binary image.

In an embodiment, the morphing is based on performing any or a combination of erosion operation and dilation operation on the binary image.

In an embodiment, the two-dimensional floor plan graph generation module extracts the two-dimensional geometry based on extraction of one or more contours from the binary image.

In an embodiment, the two-dimensional floor plan graph generation module determines type of physical space pertaining to the floor plan based on factors such as historical data, dimensions and vastu compliance.

In an embodiment, the three-dimensional model generation module allows a user to modify the generated three-dimensional model based on a pre-configured library.

In an embodiment, the one or more cyclic wall graphs are represented by one or more vertices and one or more connectives are represented by one or more edges in the two-dimensional floor plan graph.

In an embodiment, the three-dimensional model generation module is configured to compute positions and dimensions of one or more connectives of the floor plan graph based on the one or more edges in the two-dimensional floor plan graph.

Another aspect of the present disclosure pertains to a method comprising the steps of: receiving, by one or more processors, a two-dimensional image pertaining to the floor plan; processing, by the one or more processors, the two-dimensional image to generate a binary image, wherein the binary image is generated based on conversion of the two-dimensional image in a gray-scale image and performing thresholding of the gray-scale image using a pre-determined threshold value; extracting, by the one or more processors, two-dimensional geometry from the binary image to generate a two-dimensional floor plan graph, wherein the floor plan graph represents one or more cyclic wall graphs and one or more connectives; and generating, by the one or more processors, a three-dimensional model of the floor plan by performing geometric extrusion of the two-dimensional floor plan graph based on the one or more cyclic wall graphs and the one or more connectives, wherein the geometric extrusion is performed by interpolation of the floor plan graph along an axis perpendicular to a plane of the two-dimensional floor plan graph to generate a point cloud and performing a polygonal meshing operation on said generated point cloud.

Various objects, features, aspects and advantages of the inventive subject matter will become more apparent from the following detailed description of preferred embodiments, along with the accompanying drawing figures in which like numerals represent like components.

BRIEF DESCRIPTION OF THE FIGURES

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
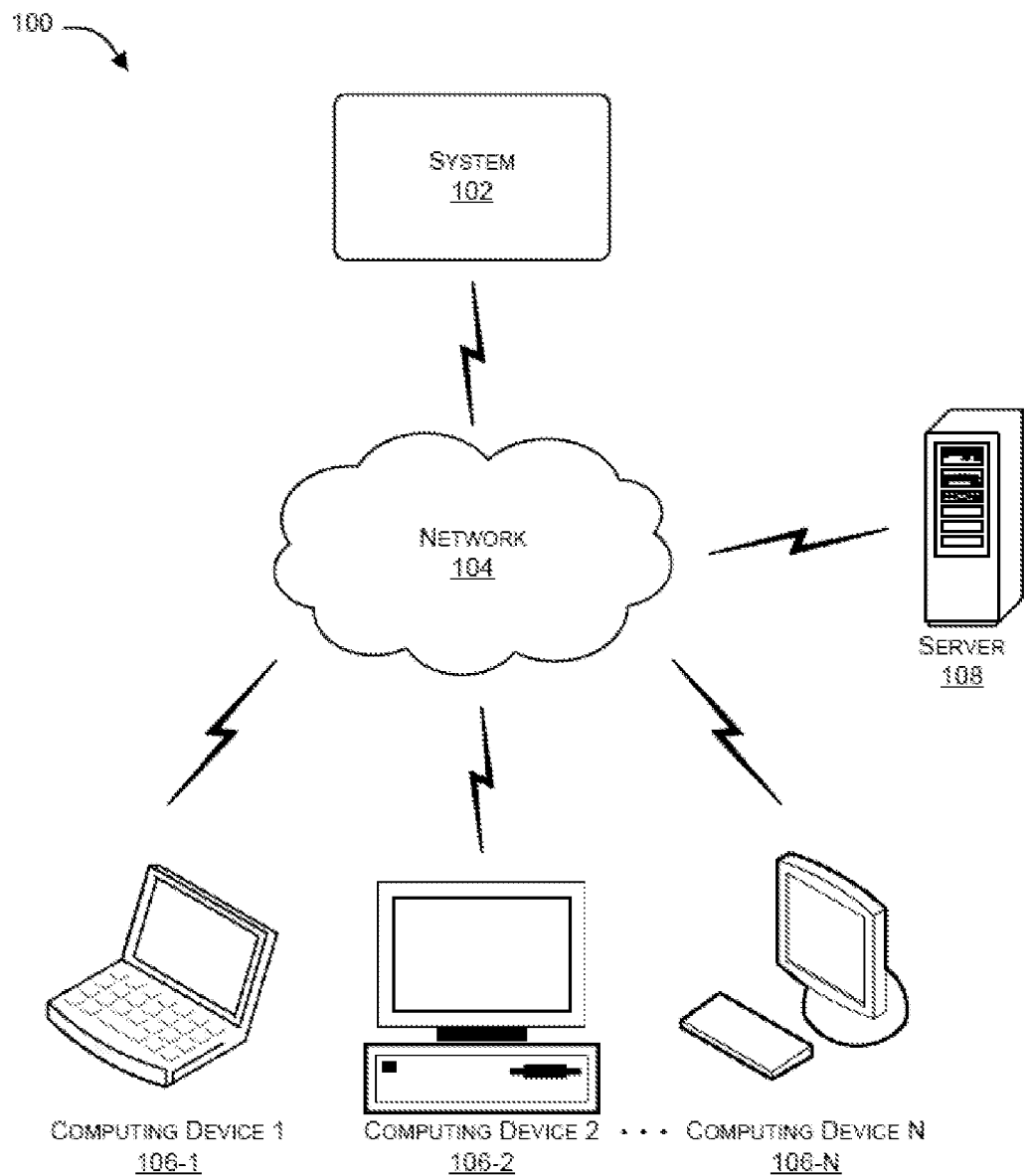
FIG. 1 illustrates exemplary architecture of a three-dimensional building model generation system in accordance with an embodiment of the present disclosure.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The system(s)/method(s), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner Software and data may be recorded in one or more computer-readable storage media.

The methods according to the above-described example embodiments of the inventive concept may be implemented with program instructions, which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

The present application provides systems and methods for generating three-dimensional building information models using two-dimensional image of the floor plans.

An aspect of the present disclosure pertains to a three-dimensional building model generation system, comprising: a non-transitory storage device having embodied therein one or more routines operable to generate a three-dimensional model pertaining to a floor plan; and one or more processors coupled to the non-transitory storage device and operable to execute the one or more routines, wherein the one or more routines include: a two-dimensional image receive module, which when executed by the one or more processors, receives a two-dimensional image pertaining to the floor plan; an image processing module, which when executed by the one or more processors, processes the two-dimensional image to generate a binary image, wherein the binary image is generated based on conversion of the two-dimensional image in a gray-scale image and performing thresholding of the gray-scale image using a pre-determined threshold value; a two-dimensional floor plan graph generation module, which when executed by the one or more processors, extracts two-dimensional geometry from the binary image to generate a two-dimensional floor plan graph, wherein the two-dimensional floor plan graph represents one or more cyclic wall graphs and one or more connectives; and a three-dimensional model generation module, which when executed by the one or more processors, generates a three-dimensional model of the floor plan by performing geometric extrusion of the two-dimensional floor plan graph based on the one or more cyclic wall graphs and the one or more connectives, wherein the geometric extrusion is performed by interpolation of the two dimensional floor plan graph along an axis perpendicular to a plane of the two-dimensional floor plan graph to generate a point cloud and performing a polygonal meshing operation on said generated point cloud.

In an embodiment, the two-dimensional image pertaining to the floor plan is any of a hand-drawn image of the floor plan, a sketch of the floor plan, a photograph of the floor plan or a computer generated image of the floor plan.

In an embodiment, the image processing module morphs the binary image to remove distortion caused by noise content from the binary image.

In an embodiment, the morphing is based on performing any or a combination of erosion operation and dilation operation on the binary image.

In an embodiment, the two-dimensional floor plan graph generation module extracts the two-dimensional geometry based on extraction of one or more contours from the binary image.

In an embodiment, the two-dimensional floor plan graph generation module determines type of physical space pertaining to the floor plan based on factors such as historical data, dimensions and vastu compliance.

In an embodiment, the three-dimensional model generation module allows a user to modify the generated three-dimensional model based on a pre-configured library.

In an embodiment, the one or more cyclic wall graphs are represented by one or more vertices and one or more connectives are represented by one or more edges in the two-dimensional floor plan graph.

In an embodiment, the three-dimensional model generation module is configured to compute positions and dimensions of one or more connectives of the floor plan graph based on the one or more edges in the two-dimensional floor plan graph.

Another aspect of the present disclosure pertains to a method comprising the steps of: receiving, by one or more processors, a two-dimensional image pertaining to the floor plan; processing, by the one or more processors, the two-dimensional image to generate a binary image, wherein the binary image is generated based on conversion of the two-dimensional image in a gray-scale image and performing thresholding of the gray-scale image using a pre-determined threshold value; extracting, by the one or more processors, two-dimensional geometry from the binary image to generate a two-dimensional floor plan graph, wherein the floor plan graph represents one or more cyclic wall graphs and one or more connectives; and generating, by the one or more processors, a three-dimensional model of the floor plan by performing geometric extrusion of the two-dimensional floor plan graph based on the one or more cyclic wall graphs and the one or more connectives, wherein the geometric extrusion is performed by interpolation of the floor plan graph along an axis perpendicular to a plane of the two-dimensional floor plan graph to generate a point cloud and performing a polygonal meshing operation on said generated point cloud.

FIG. 1 illustrates exemplary architecture of a three-dimensional building information model generation system in accordance with an embodiment of the present disclosure.

According to an embodiment of the present disclosure a three-dimensional building information model generation system 102 (also referred to as the system 102, hereinafter) can generate a three-dimensional (3D) information model (interchangeably referred to as a 3D model) from a two-dimensional (2D) image pertaining to a floor plan by using image processing techniques. The system 102 is based on Building Information Modeling (BIM) technology that can digitally create virtual 3D models of a building. Further, the 3D models can contain precise geometry and data needed to support the construction, fabrication, and procurement objects of the 3D model. Also, according to an embodiment, a BIM process can pertain to a workflow that can produce intelligent 3D models from 2D image inputs. The 3D intelligent model generated can further be integrated with information such as spatial information, geographic information, building information and the like.

As illustrated, the system 102 can be communicatively coupled with one or more computing devices 106-1, 106-2, . . . , 106-N (individually referred to as the computing device 106 and collectively referred to as the computing devices 106, hereinafter) through a network 104. In an embodiment, the system 102 can be implemented using any or a combination of hardware components and software components such as a cloud, a server, a computing system, a computing device, a network device and the like. Further, the system 102 can interact with computing devices 106 through a website or an application that can reside in the computing devices 106. In an implementation, the system 102 can be accessed by website or application that can be configured with any operating system, including but not limited to, Android™, iOS™, and the like. Examples of the computing devices 106 can include, but are not limited to, a smart phone, a portable computer, a personal digital assistant, a handheld device, a mart device and the like.

Further, the network 104 can be a wireless network, a wired network or a combination thereof that can be implemented as one of the different types of networks, such as Intranet, Local Area Network (LAN), Wide Area Network (WAN), Internet, and the like. Further, the network 104 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like.

In an aspect, the system 102 can receive a 2D image (also referred to at the input image, hereinafter) pertaining to a floor plan from the computing device 106. An input image can be a hand drawing or a computer generated image or a photograph pertaining to the floor plan and can be converted into a machine-readable format. In an embodiment, a user can upload the 2D image using the computing device 106 and the computing device 106 can provide the 2D image to the system 106. In an alternate embodiment, the system 102 can automatically fetch the 2D image from a pre-defined location when a new file is added in the pre-defined location. For instance, the system 102 can be configured with a server 108, such that when an image file pertaining to the floor plan is added in the server 108, the system 102 can automatically fetch the image file.

In an aspect, the system 102 can process the input image pertaining to the floor plan to generate a binary image. For generation of the binary image, the system 102 can convert the input image into a gray-scale image and can perform thresholding of the gray-scale. The thresholding can be preformed based on a pre-determined threshold value. Additionally, in order to remove distortions that can be caused by noise content in the binary image, the system 102 can perform morphing of the binary image that can be based on erosion operation followed by a dilation operation on the binary image.

In an aspect, the system 102 can extract 2D geometry from the binary image for generating a 2D Floor Plan Graph (FPG). The extraction of 2D geometry by the system 102 can be based on extraction and analysis of contours from the binary image. In a 2D FPG individual geometric objects or cyclic wall graphs that pertain to wall components of the floor plan or structure can be represented by vertices and connectives such as doors and windows can be represented by edges.

In an aspect, the system 102 can perform geometric extrusion of the 2D FPG to generate a detailed 3D model. The geometric extrusion can be performed by interpolating the 2D FPG along an axis perpendicular to a plane of the 2D FPG model to generate a point cloud and performing a polygonal meshing operation to generate the 3D model. Further, based on edges of the 2D FPG, connectives such as doors and windows can be aligned and positioned with respect to the 3D model.

In an aspect, the system 102 can allow user based customization of the 3D model by using a pre-configured library. The pre-configured library can contain various shapes and designs of objects in a building such that the user can select and change the style of the object. For example, the user can change style of doors and windows in the 3D model. The system can also determine the material that can be used to construct various objects present in the 3D model. Further, the user can modify the material by selecting a suitable material present in the pre-configured library pertaining to the object/component.

In an aspect, the system 102 can perform various computational analyses, for example, the system 102 can compute metric information like length, breadth, depth, area, etc of various components/objects of the 3D model. Based on such computation analyses, the system 102 can compute the requisite amount of material and estimated cost associated with each material. For example, the system can identify the number of bricks needed to construct the walls by computing the area of the wall components and can also generate an estimated cost of the said bricks. Thus, using various computation analyses, the system 102 can also determine an estimated cost that can pertain to construction of a project/building according to the 3D model.

Figure 2:
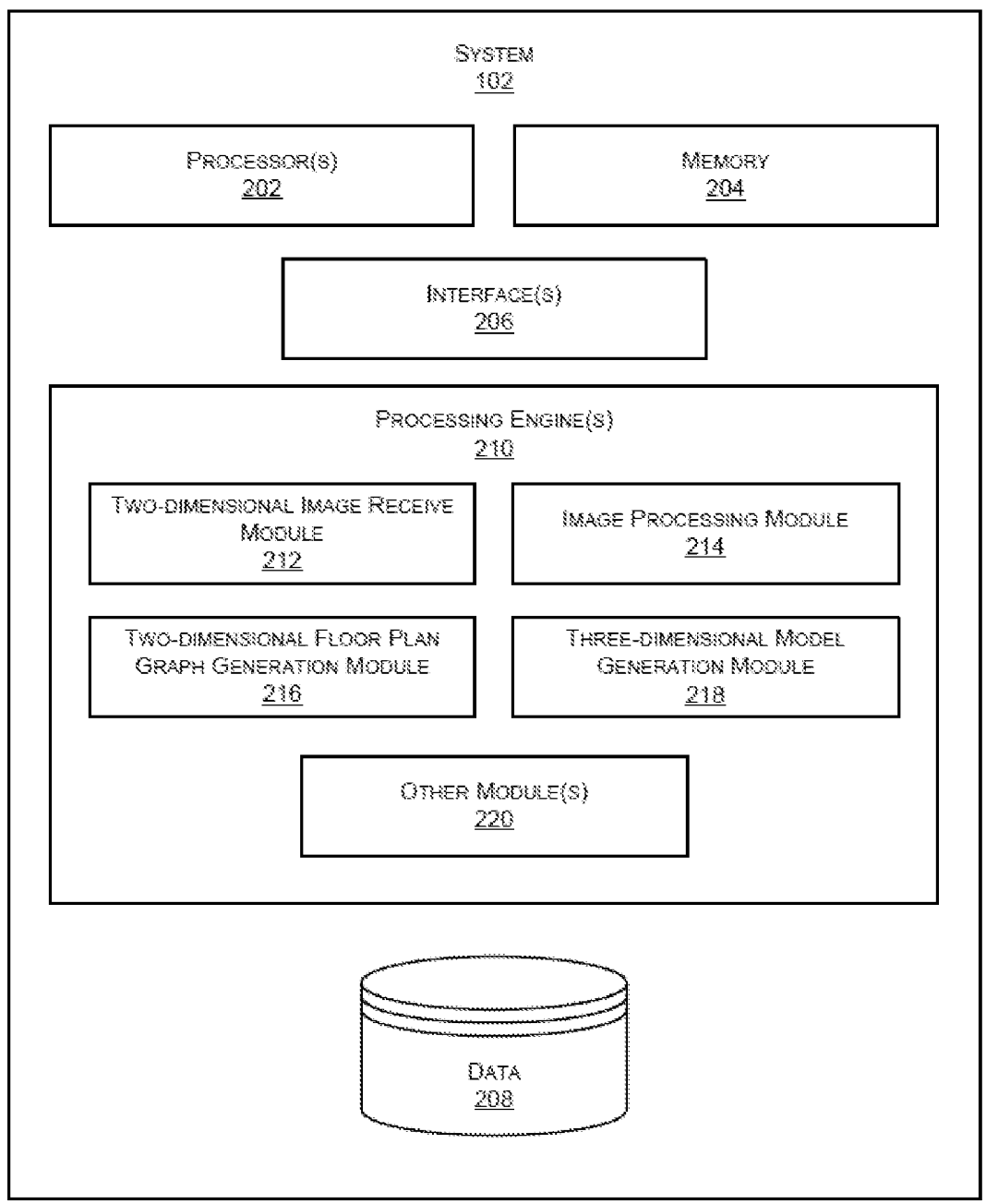
FIG. 2 illustrates exemplary functional modules of the three-dimensional building model generation system in accordance with an exemplary embodiment of the present disclosure.

FIG. 2 illustrates exemplary functional modules of the three-dimensional building information model generation system in accordance with an exemplary embodiment of the present disclosure.

As illustrated, the system 102 can include one or more processor(s) 202. The one or more processor(s) 202 can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 102. The memory 204 can store one or more computer-readable instructions or routines, which may be fetched and executed to create or share the data units over a network service. The memory 204 can include any non-transitory storage device including, for example, volatile memory such as RAM, or non-volatile memory such as EPROM, flash memory, and the like. In an example embodiment, the memory 204 may be a local memory or may be located remotely, such as a server, a file server, a data server, and the Cloud. In another example embodiment, memory 204 may be used to store the two-dimensional input image(s) and/or three-dimensional model image.

The system 102 can also include an interface(s) 206. The interface(s) 206 may include a variety of interfaces, for example, interfaces for data input and output devices, referred to as I/O devices, storage devices, and the like. The interface(s) 206 may facilitate communication of the system 102 with various devices coupled to the system 102. The interface(s) 206 may also provide a communication pathway for one or more components of the system 102. Examples of such components include, but are not limited to, processing engine(s) 210 and data 208.

The engine(s) can be implemented as a combination of hardware and programming (for example, programmable instructions) to implement one or more functionalities of the engine(s). In examples described herein, such combinations of hardware and programming may be implemented in several different ways. For example, the programming for the engine(s) may be processor executable instructions stored on a non-transitory machine-readable storage medium and the hardware for the engine(s) may include a processing resource (for example, one or more processors), to execute such instructions. In the present examples, the machine-readable storage medium may store instructions that, when executed by the processing resource, implement the engine(s). In such examples, the system 102 can include the machine-readable storage medium storing the instructions and the processing resource to execute the instructions, or the machine-readable storage medium may be separate but accessible to system 102 and the processing resource. In other examples, the engine(s) may be implemented by electronic circuitry. The data 208 can include data that is either stored or generated as a result of functionalities implemented by any of the components of the engine(s).

In an example, the processing engine(s) 210 can include a two-dimensional image receive module 212, an image processing module 214, a two-dimensional floor plan graph generation module 216, a three-dimensional model generation module 218, and other module(s) 220. The other module(s) 220 can implement functionalities that supplement applications or functions performed by the system 102 or the processing engine(s) 210.

In an aspect, the two-dimensional image receive module 212 can receive a 2D image (also referred to at the input image) that can pertain to a floor plan. In an embodiment the image receive module 212 can receive the input image through the interface(s) 206 configured with the system 102, where the interface(s) 206 can include one or more input device(s) such as a keyboard, a mouse, a display, a touchscreen display, and the like. Also, the input image can be received through one or more input port(s) of the interface(s) 206 such as Universal Serial Bus (USB) port, serial port and the like.

In another embodiment, two-dimensional image receive module 212 can receive the input image from any computing device that can be communicatively coupled with the system 102. The input image can be a 2D representation of a floor plan and can be any image such as a hand-drawn image, a sketch, a photograph, a computer generated image and so forth. The computer generated image can be any image developed using software such as Adobe Photoshop™, CorelDRAW™, etc. Hence, the input image can be in any image file format such as JPEG, TIFF, PSD, PNG, or any other equivalent format or in any document file format such as a PDF, CAD file, or any other equivalent format. Further, it would be appreciated that if the floor plan is not in a suitable format, the two-dimensional image receive module 212 can convert the input image into the suitable format to perform further processing.

In an embodiment, the two-dimensional image receive module 212 can receive the input image from a user manually. For example, the user can upload a hand-drawn sketch of a floor plan or can upload the computer generated image of the floor plan. In another embodiment, the two-dimensional image receive module 212 can fetch the input image from a pre-defined location. For example, two-dimensional image receive module 212 can fetch the 2D image once a new file/image is added for a pre-defined location such that the system 102 can automatically provide a 3D model when said file is added to the pre-defined location. Also, two-dimensional image receive module 212 can check the pre-defined location at regular intervals for addition of new files.

In an embodiment, the image processing module 214 can process the input image to generate a binary image pertaining to the floor plan. For generation of the binary image, the image processing module 214 can first convert the input image into a gray-scale image. Further, the image processing module 214 can perform thresholding of the gray-scale image based on a pre-determined threshold value to generate the binary image. The image processing module 214 can convert the gray scaled image into a binary image based upon a pre-determined threshold value. It should be noted that a variety of thresholding operations may be implemented by the image processing module 214 to convert the grey scale image to the binary image. Example techniques include, but are not limited to, adaptive Gaussian thresholding, OTSU thresholding, and global thresholding. In one example, the image processing module 214 uses OTSU thresholding if the image exhibits bimodal properties. In other embodiments, other techniques such as the adaptive Gaussian thresholding may be used.

In an embodiment, using a suitable thresholding technique, the image processing module 214 can assign a binary value (0 or 1) to each pixel of the image 102 based on whether the gray-scale intensity value of the pixel is above or below the pre-determined threshold value. Thus, each pixel of a gray-scale image can be replaced with a black pixel if the gray-scale intensity value is less than the pre-determined threshold value, or a white pixel if the gray-scale intensity value is greater than the pre-determined threshold value. In an embodiment, multiple pre-defined threshold values can be specified, such that a band of gray-scale intensity values can be set to white while the remaining grey-scale intensity values can be set to black.

It would be pertinent to note that the binary image may contain numerous distortions because of noise. Hence, the image processing module 214 can further perform morphing of the binary image in order to remove distortions caused by noise. In an embodiment, the technique of morphing can include performing of an erosion operation followed by a dilation operation on the binary image. It would be appreciated that, the erosion operation or erosion morphological transformation erodes the boundaries of foreground object so the thickness or size of the foreground object decreases and white region decreases in the image. Further, dilation operation increases the size of the foreground object such that the white region increases in the image. The erosion operation facilitates removal of white noises, and the dilation operation helps in restoring a shrunk object that may be caused due to erosion to its actual size by increasing the size of the object in the image.

In an embodiment, in order to perform morphing, image processing module 214 can process binary image based on shapes. A structuring element can be applied to the binary image, to create an output image of the same size. Erosion can remove pixels on the boundaries of an object in the binary image, whereas dilation can add pixels to the boundaries of objects in the binary image. The number of pixels removed or added from the objects in the binary image can depend on the size and shape of the structuring element used to process the binary image. In the erosion and dilation operations, the state of any given pixel in the output image can be determined by applying a rule to the corresponding pixel and its neighborhood pixels that can be defined by the structuring element. The rule used to process the pixels can define the operation as dilation or erosion. For example, in erosion operation on the binary image, if any of the pixels is set to 0, the output pixel can be set to 0 and in dilation operation on the binary image, if any of the pixels is set to 1, the output pixel can be set to 1.

In an aspect, the two-dimensional floor plan graph generation module 216 can perform 2D geometry extraction for generating a2D Floor Plan Graph (FPG). In an embodiment, the 2D FPG can be generated from the morphed binary image pertaining to the floor plane. In an example, two-dimensional floor plan graph generation module 216 can extract of 2D geometry using contour extraction and analysis of the extracted contours. As would be appreciated by the one skilled in the art, contours are boundary lines of geometric shapes within a digital image. Once contours have been extracted, several shape features such as include perimeter length, irregularity, width, height, aspect ratio, and area that are useful for identifying and classifying objects can be determined.

In an embodiment, for extraction of contours of geometric objects embedded in the binary image, techniques of computational geometry can be used. The contour extraction can work in four phases, namely, point extraction, Euclidean graph construction, point linking and contour simplification. In point extraction phase, all pixels that represent the object pattern can be extracted as a point set from the binary image. In the second phase, a geometric graph G=(V,E) can be constructed, where V consists of the extracted object point set and E consists of all possible edges whose Euclidean distance is less than a threshold parameter determined based on the point set. In point linking phase, all border points can be connected to generate the contour using orientation information that can be inferred from the clockwise turn angle at each border point. Finally, the extracted contour can be simplified using co-linearity check. Though the present disclosure explains contour extraction using above-mentioned technique, however, any other technique for contour extraction is well within the scope of the present disclosure.

According to the present disclosure, the 2D FPG can represent individual geometric objects or cyclic wall graphs that pertain to wall components of the floor plan by vertices and connectives such as doors and windows by edges. Further, the generated 2D FPG can be utilized as a parent graph for the group of cyclic wall graphs with edges defining high probability regions for existence of connectives such as doors and windows in structure or floor plan.

In one embodiment, two-dimensional floor plan graph generation module 216 can confirm position of the connectives such as doors and windows by taking inputs from the user. For example, the two-dimensional floor plan graph generation module 216 through the interface 106 can request the user to confirm the generated FPG including position of doors, windows, etc. based on which the 3D model of the building can be generated.

In an embodiment, two-dimensional floor plan graph generation module 216 can further determine type of physical space pertaining to the floor plan in the generated 2D FPG. Moreover, two-dimensional floor plan graph generation module 216 can annotate the physical spaces such as rooms in the 2D FPG. For example, the rooms can be identified and annotated as kitchen, living room, bedroom, and the like. Further, the two-dimensional floor plan graph generation module 216 can also allow the user to manually identify the type of room. In other embodiment, the type of the room can be determined based on various factors such as learning the historical data, dimensions of various physical spaces and vastu compliance. In some embodiments, two-dimensional floor plan graph generation module 216 perform a FLANN (Fast Library for Approximate Nearest Neighbours) based nearest neighbor search on the selected region and wall graph data structures. As it would be appreciated by the one skilled in the art, FLANN contains a collection of algorithms for nearest neighbor search and a technique for automatically choosing the best algorithm and optimum parameters depending on the dataset. According to the present disclosure, a FLANN based nearest neighbor search can be used to align and scale the physical space/room annotated area in the 2D floor plan graph.

In an aspect, the three-dimensional model generation module 218 can perform geometric extrusion of the 2D FPG to generate a detailed 3D model. The geometric extrusion can be performed by interpolating the 2D FPG along an axis perpendicular to a plane of the two dimensional FPG model to generate a point cloud, for example, if the 2D FPG is in x-y plane, the interpolation can be performed using a pre-determined value for the z coordinate. Further, the geometric extrusion can be performed based on the cyclic wall graphs. Also, on generation of the point cloud, the three-dimensional model generation module 218 can perform a polygonal meshing operation to generate the 3D model. As would be appreciated, in order to generate the 3D model, the polygonal meshing operation can covert the point cloud to polygon mesh or triangle mesh models, Non-uniform rational B-spline (NURBS) surface models, or Computer-aided design (CAD) models through a process of surface reconstruction that allows reconstructing of the shape and appearance of the objects of the 3D model. In an example, based on edges of the 2D FPG, the three-dimensional model generation module 218 can align and position the connectives such as doors and windows with respect to the 3D model. Further, the three-dimensional model generation module 218 can compute positions and dimensions of the connectives based on edges present in the 2D FPG.

Further, in an embodiment, once the 3D model is developed, the three-dimensional model generation module 218 coupled with a pre-configured library can allow user-based customization of the developed 3D model. The user can modify the 3D model based on pre-configured library that can contain various shapes and designs of objects in a building. For example, the user can select and change the style of individual doors and windows from a library of such structures configured with the three-dimensional model generation module 218. In addition, the three-dimensional model generation module 218 can provide the user with options to selectively edit portions of the floor plan wall components where the user needs to select only the connecting door or window component to modify the connected wall components from the floor plan graph (FPG).

In some example embodiments, the three-dimensional model generation module 218 can identify and segregate various components of the objects in the 3D model. Such components may include wall components, door components, window components, floor components and ceiling components. Further, the three-dimensional model generation module 218 can identify and assign generic materials corresponding to the individual components of the 3D model. For example, tiles material is assigned to floor component and wallpaper to wall component. However, the user can be provided with an option to modify the components from the pre-configured library of such structures.

Further, it would be appreciated that the three-dimensional model generation module 218 can compute metric information like length, breadth, depth, area, etc. of various components/objects of the 3D model. Based on such computation and material, the three-dimensional model generation module 218 can determine amount of material need for construction of the building pertaining to the 3D model and cost of said material. For example, the three-dimensional model generation module 218 can compute amount of tiles needed for the building model by computing the area of the floor as well as generate a bill of quantities (BOQ) for the tiles.

In an embodiment herein, all of the modules depicted in FIG. 2 can be present in a single device, such as a computer, a laptop, a mobile device, a tablet and the like. In another embodiment, the one or more of the modules are present across various devices communicatively coupled with each other.

Figure 3:
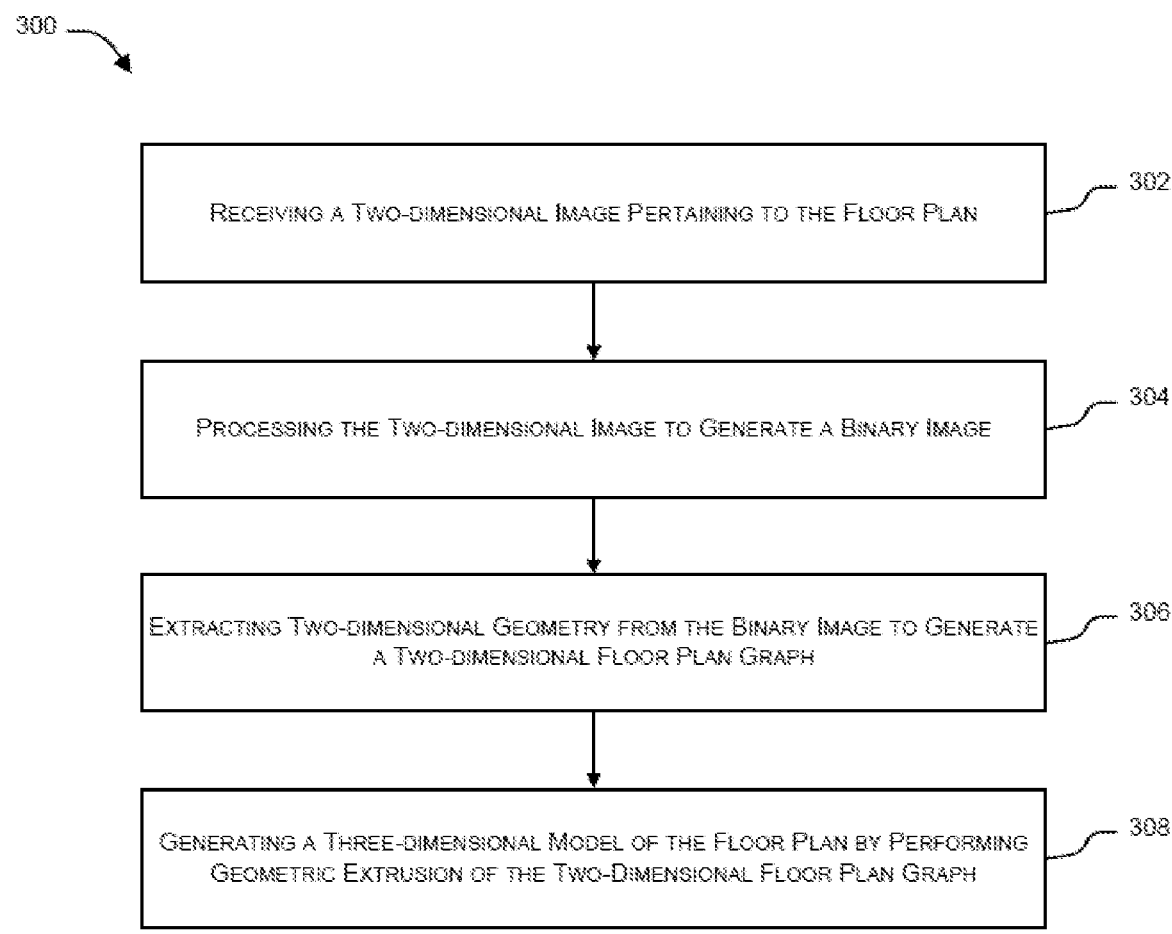
FIG. 3 is a flow chart illustrating a process for generating a three dimensional model of a floor plan from a two dimensional image in accordance with an embodiment of the present disclosure.

FIG. 3 is a flow chart illustrating a process for generating a three dimensional model of a floor plan from a two dimensional image in accordance with an embodiment of the present disclosure.

In an aspect, a method to build a 3D model pertaining to a floor plan graph can include as step 302 that pertains to receiving a 2D image/input image pertaining to the floor plan from a computing device. The input image can be provided manually by a user or can be fetched from a pre-defined location. The input image can be a 2D representation of a floor plan, and can be in the form an image format such as JPEG, TIFF, PSD, and PNG) or a document format such as a PDF, CAD file, or any other equivalent format.

In an aspect, the method can include a step 204 pertaining to processing the input image to generate a binary image. Said processing can be done by converting the input image into a gray-scale image and subsequently performing thresholding operation using a suitable technique. Example techniques that can be used for thresholding operation can include, but are not limited to, adaptive Gaussian thresholding, OTSU thresholding and global thresholding. In an embodiment, the method can include a step of morphing in which an operation can be performed on the binary image to eliminate distortions caused by noise in the image.

In an aspect, the method can include a step 306, pertaining to extracting 2D geometry from the binary image to generate a 2D FPG. The 2D geometry extraction can be performed using contour extraction techniques. Further, the 2D FPG can be generated by considering individual geometric components in the extracted 2D geometry as vertices and the connectives (doors and windows) as edges that is described with respect to FIGS. 5A-B. Here, the individual geometric components can be considered as cyclic wall graphs that can define wall components in the floor plan. In one example embodiment, user can provide an input for confirming the position of doors and windows in the 2D FPG.

In an aspect, the method can include a step 308 pertaining to generating a 3D model by performing geometric extrusion of the 2DFPG. In an embodiment, the geometric extrusion of the 2D FPG can be performed based on the cyclic wall graphs, position of doors and windows along with the interior annotations for physical space. The geometric extrusion can be performed by considering the 2D wall graphs and performing interpolation along an axis perpendicular to a plane of 2D FPG. For example, interpolation along z coordinate can be performed if the 2D FPG is present in the x-y plane of the 3D co-ordinate system. Said interpolation can generate a point cloud. In order to generate a 3D model, a polygonal meshing operation can be performed on the point cloud.

It would be appreciated that the 3D can be generated using a Building Information Modeling process. In one embodiment, the 3D model can utilize spatial information to pre-compute positions and dimensions of the features present in the floor plans of a structure such as a building. Examples of such features include doors, windows and other structural features.

In another example embodiment, an orientation can be done using the real world coordinates to achieve effective designs. Further, based on the input positions of doors and windows, the doors and windows can be geometrically aligned and can be positioned in the 3D model.

In an embodiment, various components of the structure can be identified and segregated in the 3D model. Such components may include wall components, door components, window components, floor components and ceiling components. Further, generic materials corresponding to the individual components can be identified and assigned to the 3D model. For example, tiles material can be assigned to floor component and wallpaper to wall component. However, the user can be provided with an option to modify the components from a pre-created library of such structures.

In further embodiment, metric information including length, breadth, depth, and area of components of the structure can be computed for the 3D model. Further, data pertaining to material consumption or usage can be generated. For example, an area analysis and volume analysis can be performed for each individual component of the 3D model. For example, the number of bricks required to construct the walls can be computed by calculating the total area of the wall components and a BOQ for the materials can also generated.

Embodiments herein can also provide an option to selectively edit certain portions of the floor plan wall components where the user needs to select only the connecting door or window component to modify the connected wall components from the 2D FPG. In an embodiment, the user can be provided with an option to select and change the style of the individual doors and windows.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 4:
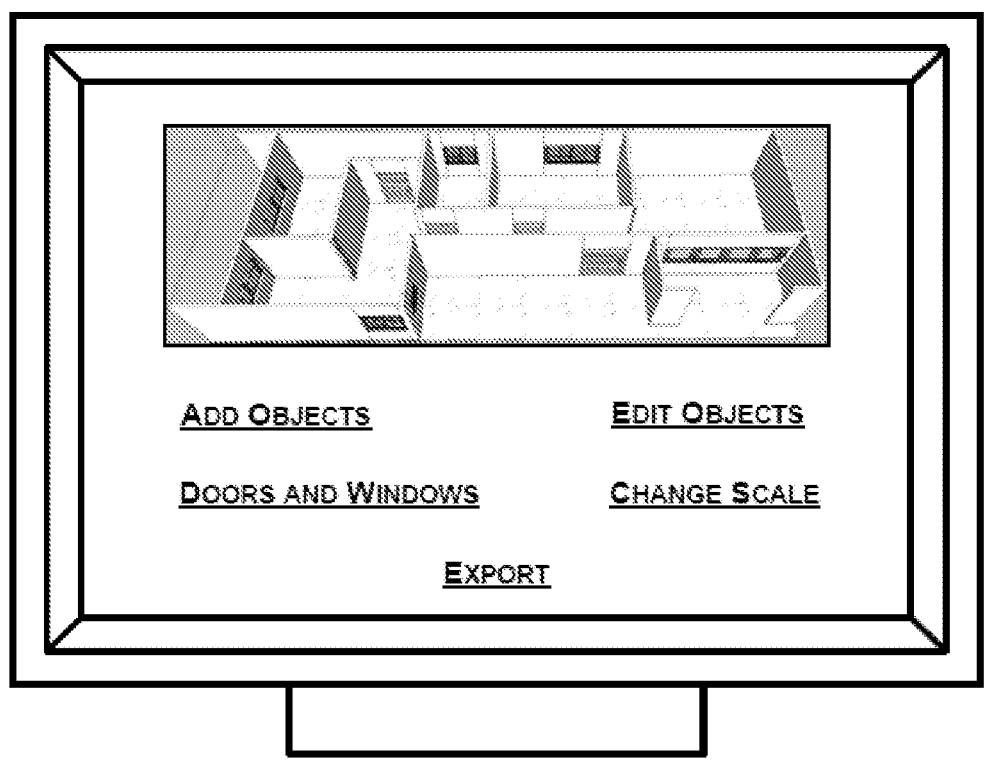
FIG. 4 illustrates an exemplary representation of various options provided for customization of the three-dimensional model in accordance with an embodiment of the present disclosure.

FIG. 4 illustrates an exemplary representation of various options provided for customization of the three-dimensional model in accordance with an embodiment of the present disclosure.

In an embodiment, the user can upload a hand drawn sketch or a computer generated floor plan image to build a 3D model. In order to provide customization, as illustrated, the user can be provided with various options such as "Add Objects", "Edit Objects", "Doors and Windows", "Change Scale" and "Export". It would also be pertinent to note that the customization can be performed in 2D model as well as 3D model.

In an embodiment, "Add Objects" can be used to add or indicate physical spaces/objects in the model such as rooms, kitchen, dining, workspace, lift, garden, etc. Once the user adds a physical space, representation of said physical space can be seen in the model in real time. Further, using "Edit Objects", the user can modify various objects of the model. For example, the user can resize an object indicating a kitchen. Further, the user can also edit any vertices or edge present in the model.

In an embodiment, using "Doors and Windows" option, the user can decide various positions and dimensions of doors and windows in the model. Further, the shape, size and appearance of doors and windows can be chosen from a pre-configured library.

In an embodiment, using "change scale" option, the user can convert scale in various measurement units such as meters, inches and the like.

In an embodiment, using the "Export" option, the user can export the model in various formats such as DXF, PDF, SVG, etc. Such that the user can refer to the generated 3D model at a later stage.

In an embodiment, the user can be provided with additional options such as "Project Properties", "Object Properties" and "Materials". Using "Project properties", a user can specify various project attributes such as project type, project area, build up area, maximum height, etc. Using "Object Properties", a user can modify attributes of a specific object of the model such as type, name, area, volume, etc. Using "Materials", user can modify or add materials that can be used for construction of various objects of the model. It would be appreciated that all user based customization can be represented in the generated 3D model in real time.

Figure 5A:
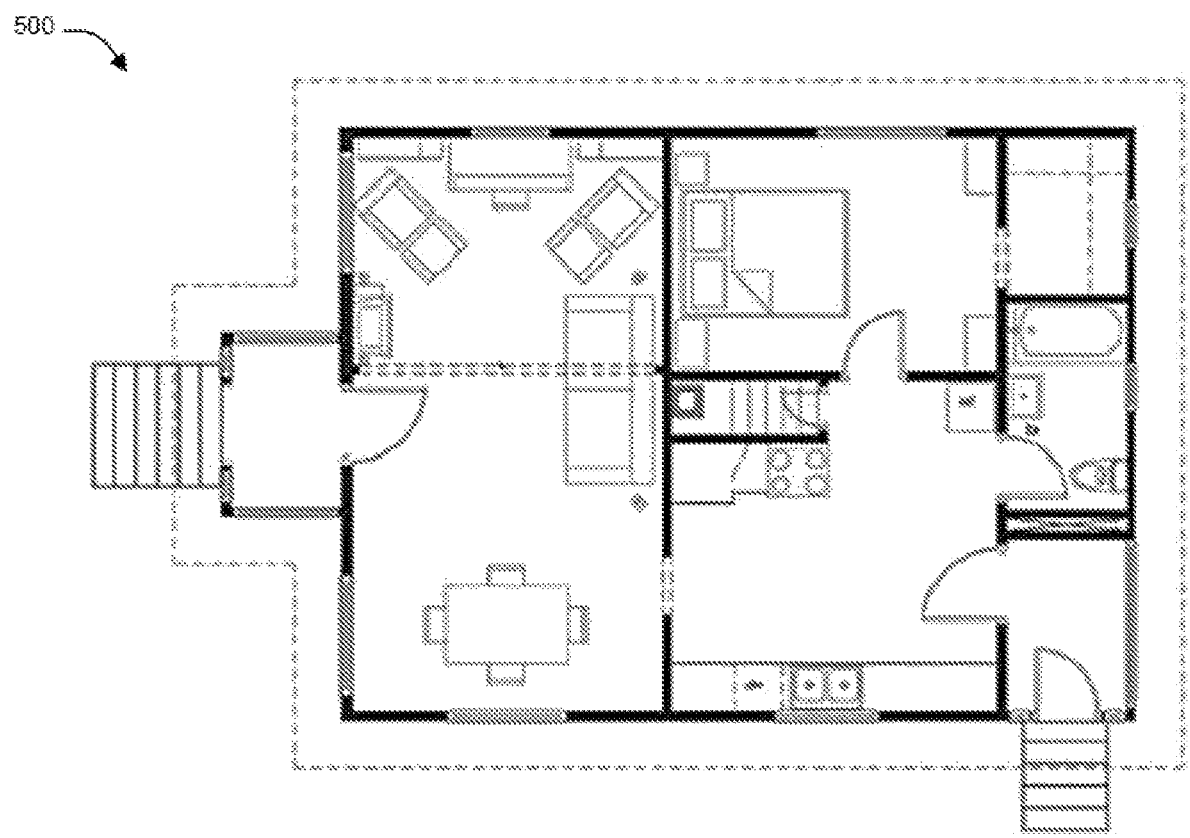
FIGS. 5A-B illustrates exemplary representation of a technique used for generation of the three-dimensional model in accordance with an embodiment of the present disclosure.
Figure 5B:
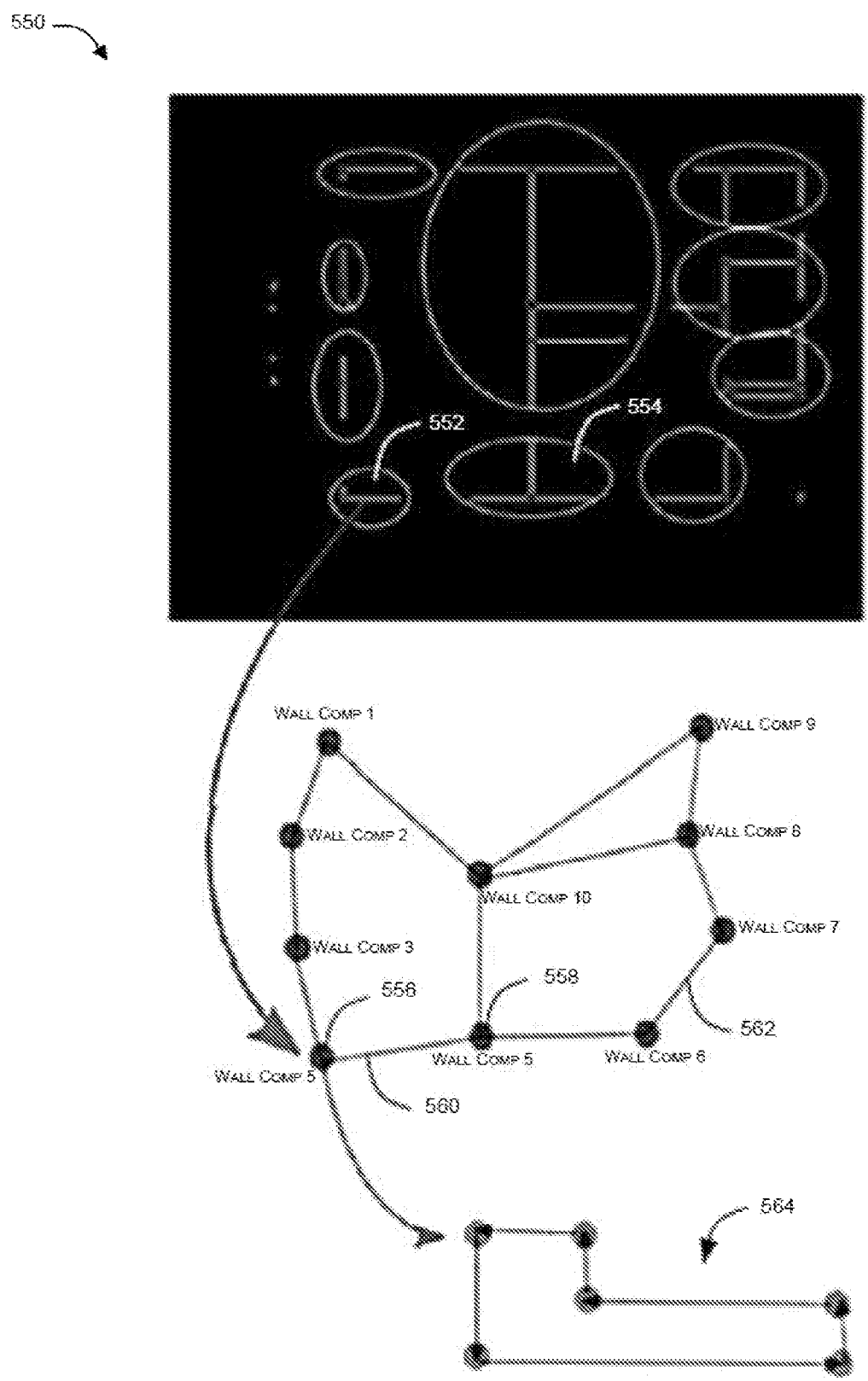

FIGS. 5A-B illustrates exemplary representation of a technique used for generation of the three-dimensional model in accordance with an embodiment of the present disclosure.

FIG. 5A represents a 2D image/input image pertaining to a floor plan that can be received by the system 102. The input image can be in a suitable format. Example formats for the input image can include, but are not limited to, JPEG, TIFF, PSD, PNG, PDF, and CAD. The input image can include representation of the various physical spaces or rooms along with other structures and connectives such as doors and windows located in each of the room.

FIG. 5 B represents an example 2D FPG generated from extraction of 2D geometry from the binary image. In an example as shown, the 2D geometry can be represented in the form of a group of cyclic wall graphs. Here, the circled regions (e.g., 552, 554) represent the cyclic wall graphs. As can be seen, each individual cyclic wall graph (e.g., 552, 554) of the floor plan graph can be represented as a vertex (e.g., 556, 558) and the adjacent areas of the cyclic wall graphs can represent the connectives (e.g., 560, 562). An individual cyclic wall graph, such as represented by reference numeral 564 can include vertices and edges and can be extracted from the contours of the floor plan. Such cyclic wall graphs constitute the wall components in the 3D model that is generated from the 2D floor plan graph 552.

Figure 6A:
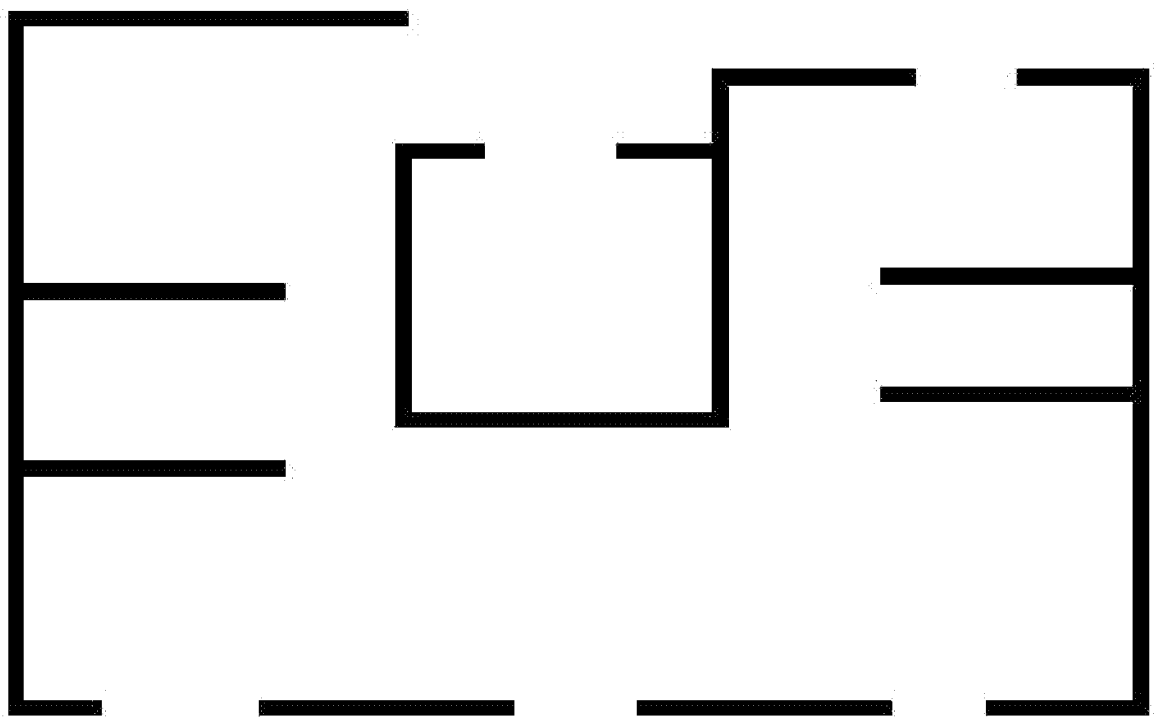
FIGS. 6A-B illustrates an exemplary representation of an example conversion of a 2D image to a 3D model in accordance with an embodiment of the present disclosure.
Figure 6B:
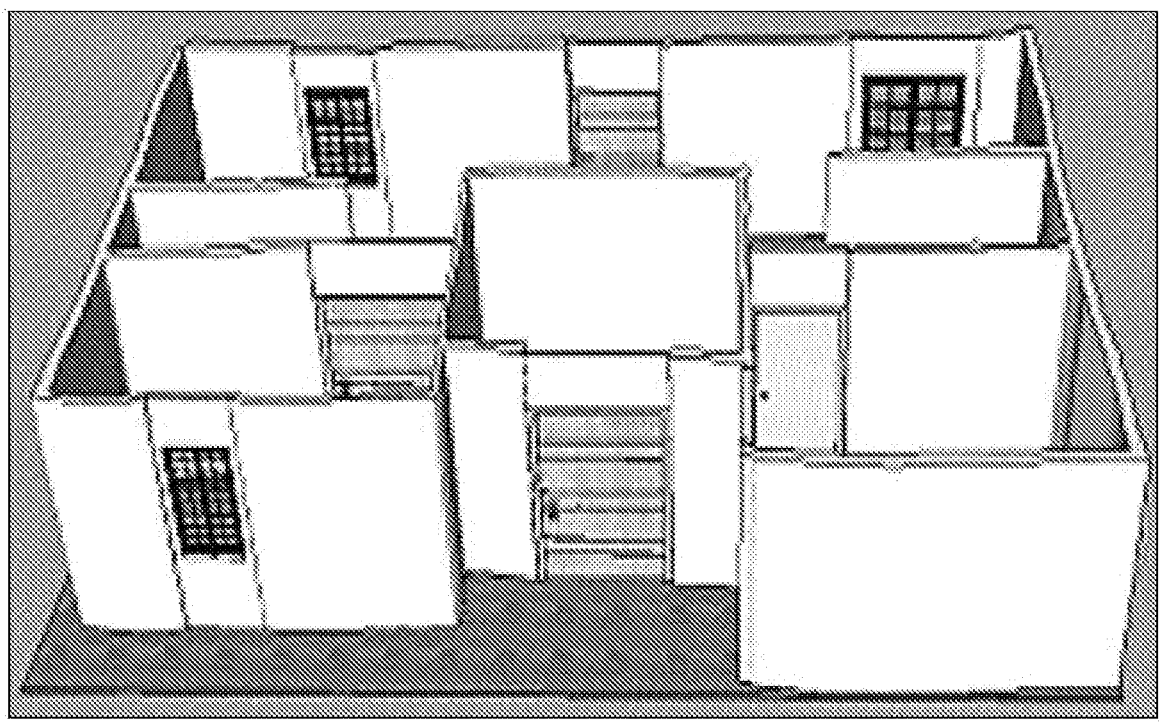

FIGS. 6A-B illustrate an exemplary representation of an example conversion of a 2D image to a 3D model in accordance with an embodiment of the present disclosure.

As illustrated, FIG. 6A-B indicate conversion of a 2D hand drawn floor plan into a 3D model. In this example, the 2D floor plan graph as represented in FIG. 6A is extruded to generate the detailed 3D model as represented in FIG. 6B. The detailed 3D model of FIG. 6B can be formed using a pre-determined value for the z coordinate. In this example, the geometric extrusion of the 2D model of FIG. 6A can be performed using the 2D wall graphs and an interpolation along z coordinates can be performed for generating a point cloud that can be followed by a polygonal meshing operation to generate the 3D model of FIG. 6B.

Figure 7A:
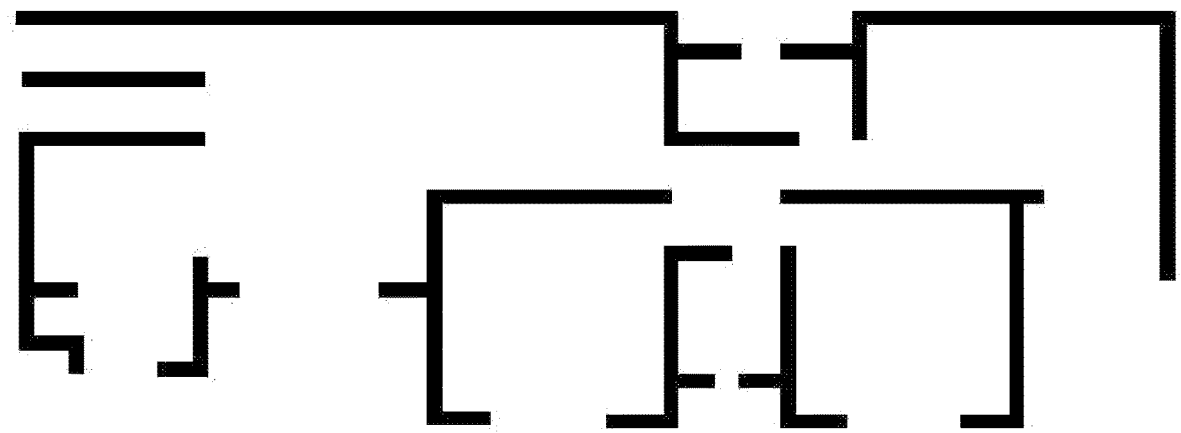
FIGS. 7A-B illustrates an exemplary representation of an example conversion of a 2D image to a 3D model in accordance with an embodiment of the present disclosure.
Figure 7B:
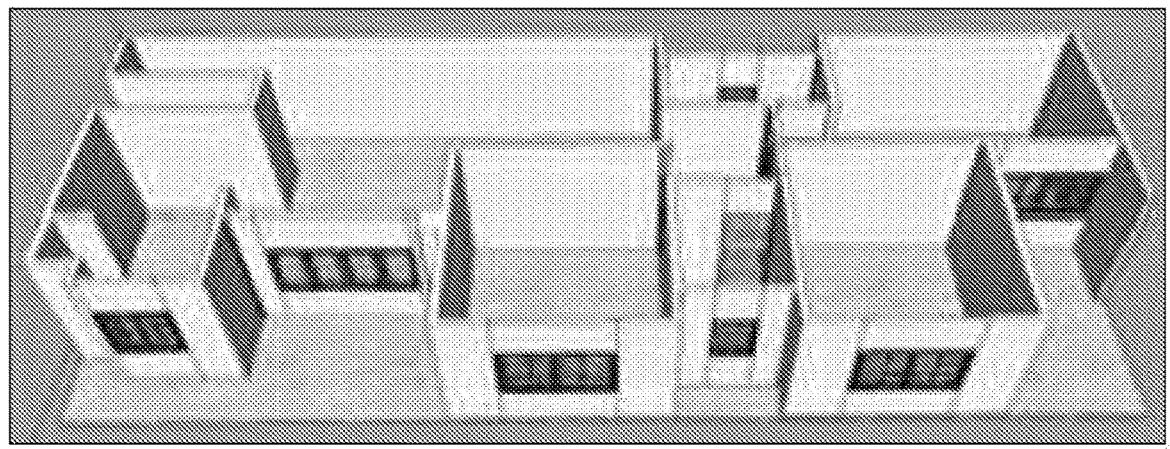

FIGS. 7A-B illustrates an exemplary representation of an example conversion of a 2D image to a 3D model in accordance with an embodiment of the present disclosure. As illustrated, FIG. 7A represent another hand drawn sketch pertaining to a floor plan that can be converted into a 3D model as illustrated in FIG. 7B using embodiments of the present disclosure.

Figure 8A:
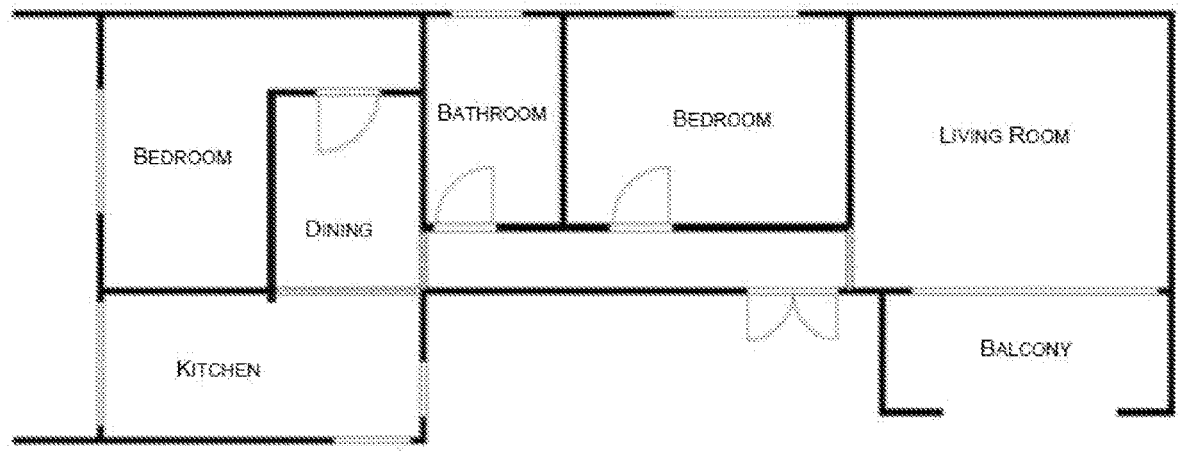
FIGS. 8A-B illustrates an exemplary representation of an example conversion of a 2D image to a 3D model in accordance with an embodiment of the present disclosure.
Figure 8B:
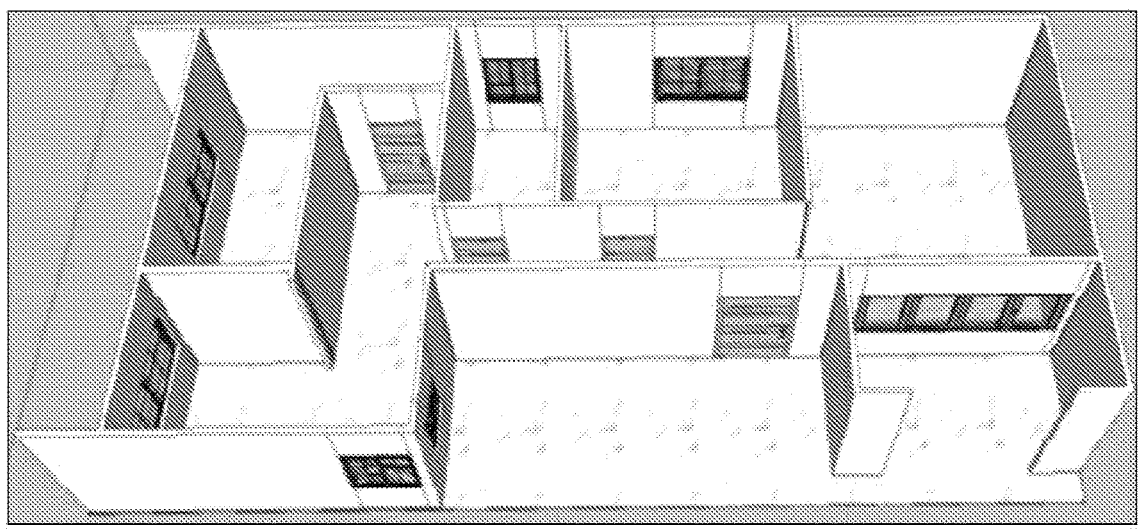

FIGS. 8A-B illustrates an exemplary representation of an example conversion of a 2D image to a 3D model in accordance with an embodiment of the present disclosure. As illustrated, FIG. 8A represent a 2D image of a floor plan that can be provided to the system 102 in order to generate a 3D model as illustrated in FIG. 8B using various embodiments of the present disclosure.

Figure 9:
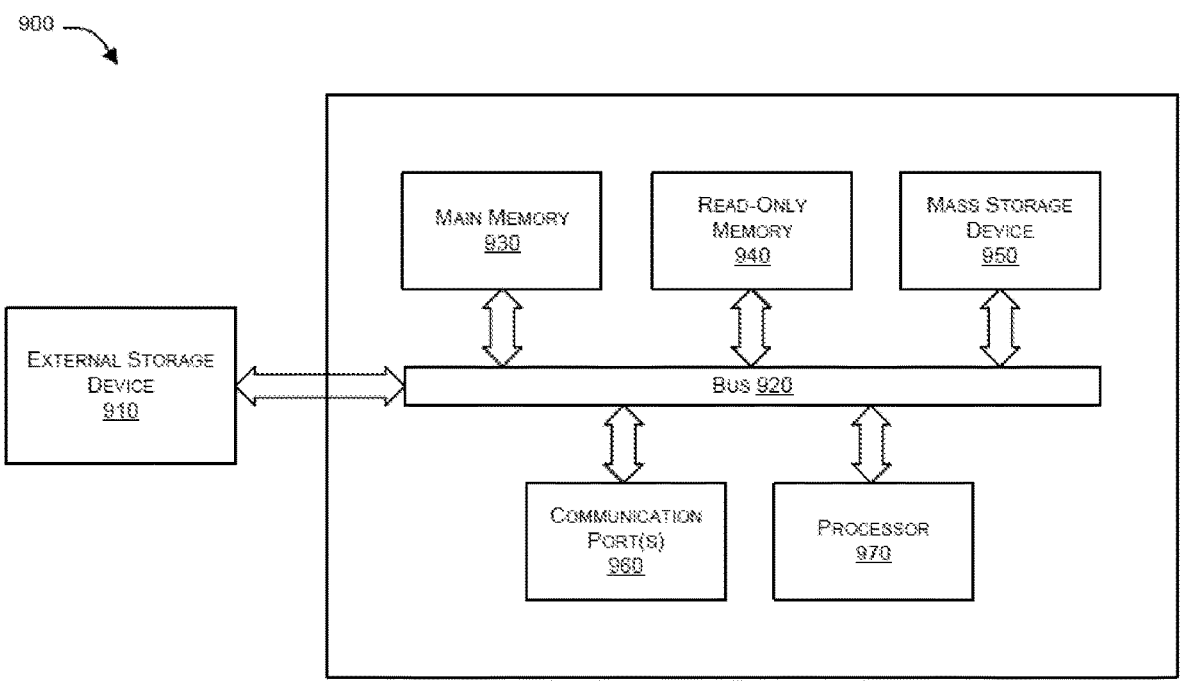
FIG. 9 illustrates an exemplary computer system in which or with which embodiments of the present disclosure can be utilized in accordance with embodiments of the present disclosure.

FIG. 9 illustrates an exemplary computer system in which or with which embodiments of the present disclosure can be utilized in accordance with embodiments of the present disclosure.

As shown in FIG. 9, computer system includes an external storage device 910, a bus 920, a main memory 930, a read only memory 940, a mass storage device 950, communication port 960, and a processor 970. A person skilled in the art will appreciate that computer system may include more than one processor and communication ports. Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various modules associated with embodiments of the present invention. Communication port 960 can be any of an RS-232 port for use with a modem based dialup connection, a 10/100 Ethernet port, a Gigabit or 10 Gigabit port using copper or fiber, a serial port, a parallel port, or other existing or future ports.

Communication port 960 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g., start-up or BIOS instructions for processor 970. Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.), It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim, they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions, which have a configuration that is independent of the subject matters of the preceding dependent claims.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer. The computer programs include processor-executable instructions that are stored on at least one non-transitory computer-readable medium.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scale, Eiffel, Smalltalk, Erlangen, Ruby, Flash®, Visual Basic®, Lua, and Python®.

Example embodiments being thus described, it will be obvious that the same may be varied in many ways. Such variations are not to be regarded as a departure from the spirit and scope of inventive concepts, and all such modifications as would be obvious to one skilled in the art are intended to be included within the scope of the following claims.

Advantages of the Present Disclosure

The present disclosure provides system and method for generating a three-dimensional building information model from a two-dimensional image of a floor plan.

The present disclosure provides system and method for generating a three-dimensional building information model from a two-dimensional image of a floor plan that can account for dynamic changes in the floor plan.

The present disclosure provides system and method for generating a three-dimensional building information model from a two-dimensional image of a floor plan based on techniques that are time effective and less cumbersome.

The present disclosure provides system and method for generating a three-dimensional building information model from a two-dimensional image of a floor plan that provides enhanced performance and reliability as compared to existing solutions.

I claim:

1. A three-dimensional building model generation system, comprising:
   a non-transitory storage device having embodied therein one or more routines operable to generate a three-dimensional model pertaining to a floor plan; and
   one or more processors coupled to the non-transitory storage device and operable to execute the one or more routines, wherein the one or more routines include:
      a two-dimensional image receive module, which when executed by the one or more processors, receives a two-dimensional image pertaining to the floor plan;
      an image processing module, which when executed by the one or more processors, processes the two-dimensional image to generate a binary image, wherein the binary image is generated based on conversion of the two-dimensional image in a gray-scale image and performing thresholding of the gray-scale image using a pre-determined threshold value, wherein the image processing module morphs the binary image to remove distortion caused by noise content from the binary image;
      a two-dimensional floor plan graph generation module, which when executed by the one or more processors, extracts two-dimensional geometry from the binary image to generate a two-dimensional floor plan graph, wherein the two-dimensional floor plan graph represents one or more cyclic wall graphs and one or more connectives; and
      a three-dimensional model generation module, which when executed by the one or more processors, generates a three-dimensional model of the floor plan by performing geometric extrusion of the two-dimensional floor plan graph based on the one or more cyclic wall graphs and the one or more connectives, wherein the geometric extrusion is performed by interpolation of the two dimensional floor plan graph along an axis perpendicular to a plane of the two-dimensional floor plan graph to generate a point cloud and performing a polygonal meshing operation on said generated point cloud.

2. The system of claim 1, wherein the two-dimensional image pertaining to the floor plan is any of a hand-drawn image of the floor plan, a sketch of the floor plan, a photograph of the floor plan or a computer generated image of the floor plan.

3. The system of claim 1, wherein the morphing is based on performing any or a combination of erosion operation and dilation operation on the binary image.

4. The system of claim 1, wherein the two-dimensional floor plan graph generation module extracts the two-dimensional geometry based on extraction of one or more contours from the binary image.

5. The system of claim 1, wherein the two-dimensional floor plan graph generation module determines type of physical space pertaining to the floor plan based on factors such as historical data, dimensions and vastu compliance.

6. The system of claim 1, wherein the three-dimensional model generation module allows a user to modify the generated three-dimensional model based on a pre-configured library.

7. The system of claim 1, wherein the one or more cyclic wall graphs are represented by one or more vertices and one or more connectives are represented by one or more edges in the two-dimensional floor plan graph.

8. The system of claim 7, wherein the three-dimensional model generation module is configured to compute positions and dimensions of one or more connectives of the floor plan graph based on the one or more edges in the two-dimensional floor plan graph.

9. A method comprising the steps of:
   receiving, by one or more processors, a two-dimensional image pertaining to the floor plan;
   processing, by the one or more processors, the two-dimensional image to generate a binary image, wherein the binary image is generated based on conversion of the two-dimensional image in a gray-scale image and performing thresholding of the gray-scale image using a pre-determined threshold value, wherein the binary image is morphed to remove distortion caused by noise content from the binary image;
   extracting, by the one or more processors, two-dimensional geometry from the binary image to generate a two-dimensional floor plan graph, wherein the floor plan graph represents one or more cyclic wall graphs and one or more connectives; and
   generating, by the one or more processors, a three-dimensional model of the floor plan by performing geometric extrusion of the two-dimensional floor plan graph based on the one or more cyclic wall graphs and the one or more connectives, wherein the geometric extrusion is performed by interpolation of the floor plan graph along an axis perpendicular to a plane of the two-dimensional floor plan graph to generate a point cloud and performing a polygonal meshing operation on said generated point cloud.

* * * * *